(12) United States Patent
Burenga

(10) Patent No.: US 11,180,899 B2
(45) Date of Patent: *Nov. 23, 2021

(54) ELECTRIC GRAPPLE FOR COMPACT TRACTORS WITH LOADER

(71) Applicant: Timothy M. Burenga, Litchfield, IL (US)

(72) Inventor: Timothy M. Burenga, Litchfield, IL (US)

(73) Assignee: Worksaver, Inc., Litchfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/602,973

(22) Filed: Jan. 8, 2020

(65) Prior Publication Data

US 2020/0157767 A1 May 21, 2020

Related U.S. Application Data

(63) Continuation-in-part of application No. 15/932,541, filed on Mar. 13, 2018, now Pat. No. 10,584,462, which is a continuation-in-part of application No. 14/999,087, filed on Mar. 29, 2016, now Pat. No. 10,066,360.

(60) Provisional application No. 62/177,920, filed on Mar. 27, 2015.

(51) Int. Cl.
*E02F 3/40* (2006.01)
*A01B 43/00* (2006.01)

(52) U.S. Cl.
CPC .............. *E02F 3/404* (2013.01); *A01B 43/00* (2013.01)

(58) Field of Classification Search
CPC ........... E02F 3/404; E02F 3/962; A01B 43/00
See application file for complete search history.

(56) References Cited

U.S. PATENT DOCUMENTS

| | | | | |
|---|---|---|---|---|
| 3,152,706 | A * | 10/1964 | Conrad | B66C 1/68 |
| | | | | 414/732 |
| 3,250,028 | A * | 5/1966 | Hunger | E02F 3/404 |
| | | | | 37/406 |
| 3,455,477 | A * | 7/1969 | Blair | B60P 3/41 |
| | | | | 414/704 |
| 3,477,602 | A * | 11/1969 | Peterson | E02F 3/404 |
| | | | | 414/704 |
| 3,485,396 | A * | 12/1969 | Lundquist | B60P 1/50 |
| | | | | 414/732 |
| 3,669,293 | A * | 6/1972 | Bryan | B66C 3/20 |
| | | | | 414/704 |
| 4,285,628 | A * | 8/1981 | Jankowski | A01D 87/003 |
| | | | | 414/739 |
| 4,372,063 | A * | 2/1983 | Work | A01G 23/093 |
| | | | | 37/301 |

(Continued)

*Primary Examiner* — Jamie L McGowan
(74) *Attorney, Agent, or Firm* — Paul M. Denk

(57) ABSTRACT

A debris grapple bucket attachment for securement with the loader of a compact tractor, generally used in conjunction with the front end loader of a tractor, the attachment comprising a grapple incorporating a grapple bucket for use in combination with a front rake like member, with the grapple bucket having sidewalls, a formed back wall, all structurally integrated together, with the rake like member being secured with an electrically operated industrial linear actuator, to provide for pivoting of the rake like member from an open to a closed position as when urging debris onto its grapple bucket, and to retain the same, for removal.

6 Claims, 8 Drawing Sheets

(56) References Cited

U.S. PATENT DOCUMENTS

| | | | | |
|---|---|---|---|---|
| 4,925,359 A * | 5/1990 | Dunnegan | | E02F 3/404 414/704 |
| 5,060,732 A * | 10/1991 | Baskett | | A01B 33/021 171/19 |
| D332,271 S * | 1/1993 | DuBose | | D15/32 |
| 5,516,174 A * | 5/1996 | Squyres | | A01G 23/04 294/206 |
| 5,564,885 A * | 10/1996 | Staben, Jr. | | E02F 3/962 414/724 |
| 5,639,205 A * | 6/1997 | Kaczmarczyk | | A01B 43/00 37/406 |
| 5,957,650 A * | 9/1999 | Rollo | | E02F 3/404 37/406 |
| 5,971,455 A * | 10/1999 | Wolin | | B66C 3/16 294/106 |
| 6,074,160 A * | 6/2000 | Brumbaugh | | E02F 3/3609 37/903 |
| 6,109,859 A * | 8/2000 | Domann | | B66F 9/065 294/67.22 |
| 6,176,531 B1 * | 1/2001 | Wheeler | | B66C 3/16 294/104 |
| 6,267,547 B1 * | 7/2001 | Lund | | B66F 9/065 294/68.1 |
| 6,287,072 B1 * | 9/2001 | Wasilas | | E02F 3/404 37/406 |
| 6,357,993 B1 * | 3/2002 | Burton | | E02F 3/34 37/406 |
| 6,487,797 B1 * | 12/2002 | Inoue | | E02F 3/4135 37/188 |
| 6,526,678 B2 * | 3/2003 | Waddington, Jr. | | E02F 3/404 172/811 |
| 6,601,891 B1 * | 8/2003 | Gregory, Jr. | | B66C 1/585 294/104 |
| 6,820,357 B1 * | 11/2004 | Menard | | A01B 43/00 294/201 |
| 6,939,099 B1 * | 9/2005 | Stokkeland | | E02F 3/3627 37/406 |
| 7,241,101 B2 * | 7/2007 | Bauer | | A01F 25/2027 414/726 |
| 7,431,554 B2 * | 10/2008 | Westendorf | | B66C 1/585 294/201 |
| 7,631,446 B1 * | 12/2009 | Davis | | E02F 3/3405 37/444 |
| 8,069,591 B2 * | 12/2011 | Dunn | | A01D 87/0076 37/406 |
| 8,109,709 B1 * | 2/2012 | Gaetze | | E02F 3/404 414/724 |
| 8,615,907 B2 * | 12/2013 | Miller | | E02F 3/404 37/406 |
| 8,695,239 B2 * | 4/2014 | Seda | | E02F 3/404 37/406 |
| 9,518,405 B2 * | 12/2016 | Hull | | E04H 17/265 |
| 9,611,618 B2 * | 4/2017 | Miller | | E02F 3/404 |
| 10,066,360 B2 * | 9/2018 | Burenga | | E02F 3/404 |
| 10,584,462 B2 * | 3/2020 | Burenga | | E02F 3/3663 |
| 2002/0044862 A1 * | 4/2002 | Burton | | E02F 3/34 414/724 |
| 2009/0211121 A1 * | 8/2009 | Doster, Jr. | | E02F 3/407 37/468 |
| 2009/0297325 A1 * | 12/2009 | Daraie | | A01D 87/127 414/800 |
| 2013/0042507 A1 * | 2/2013 | Seda | | E02F 3/404 37/406 |
| 2016/0340862 A1 * | 11/2016 | Miller | | A01B 43/00 |

\* cited by examiner

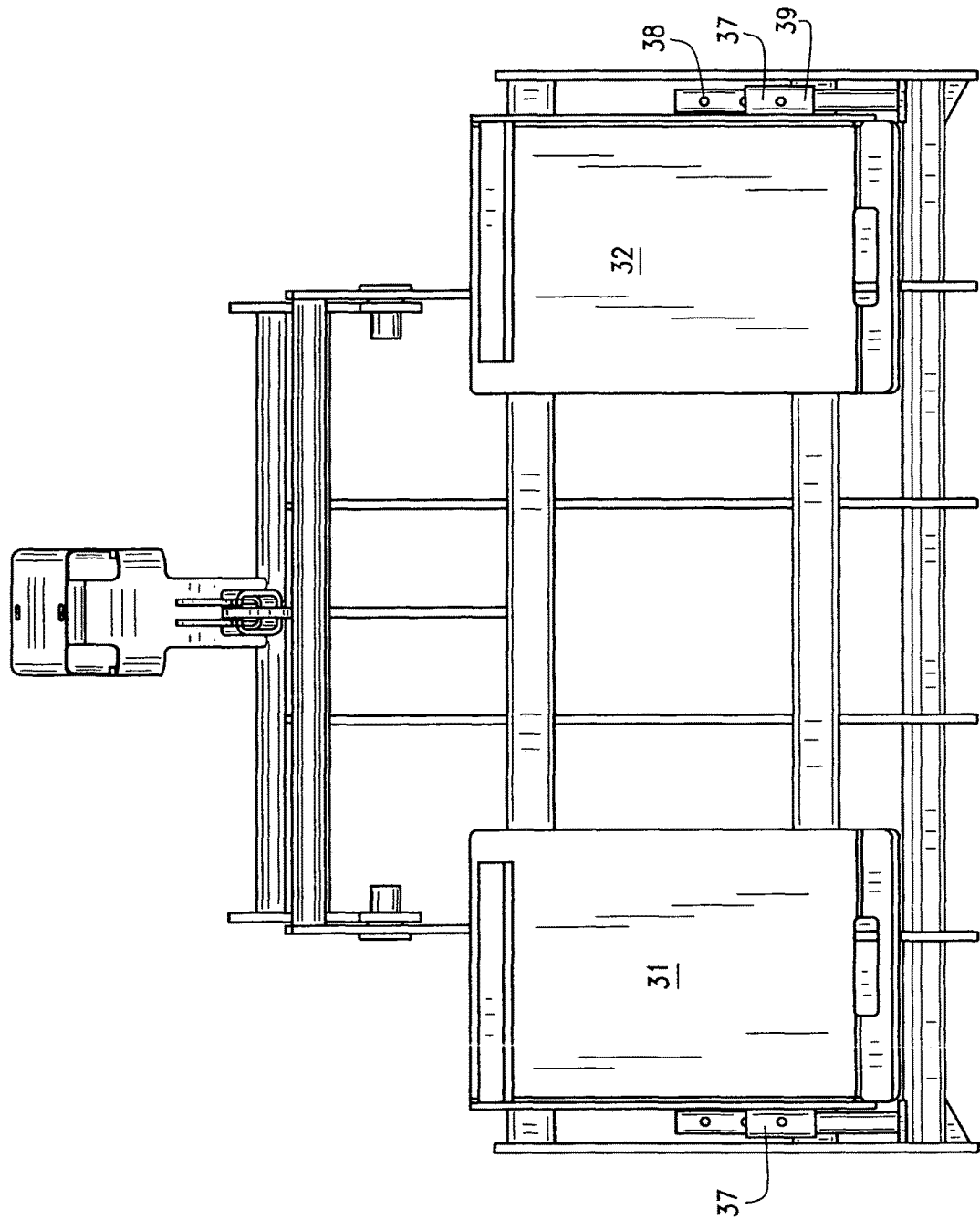

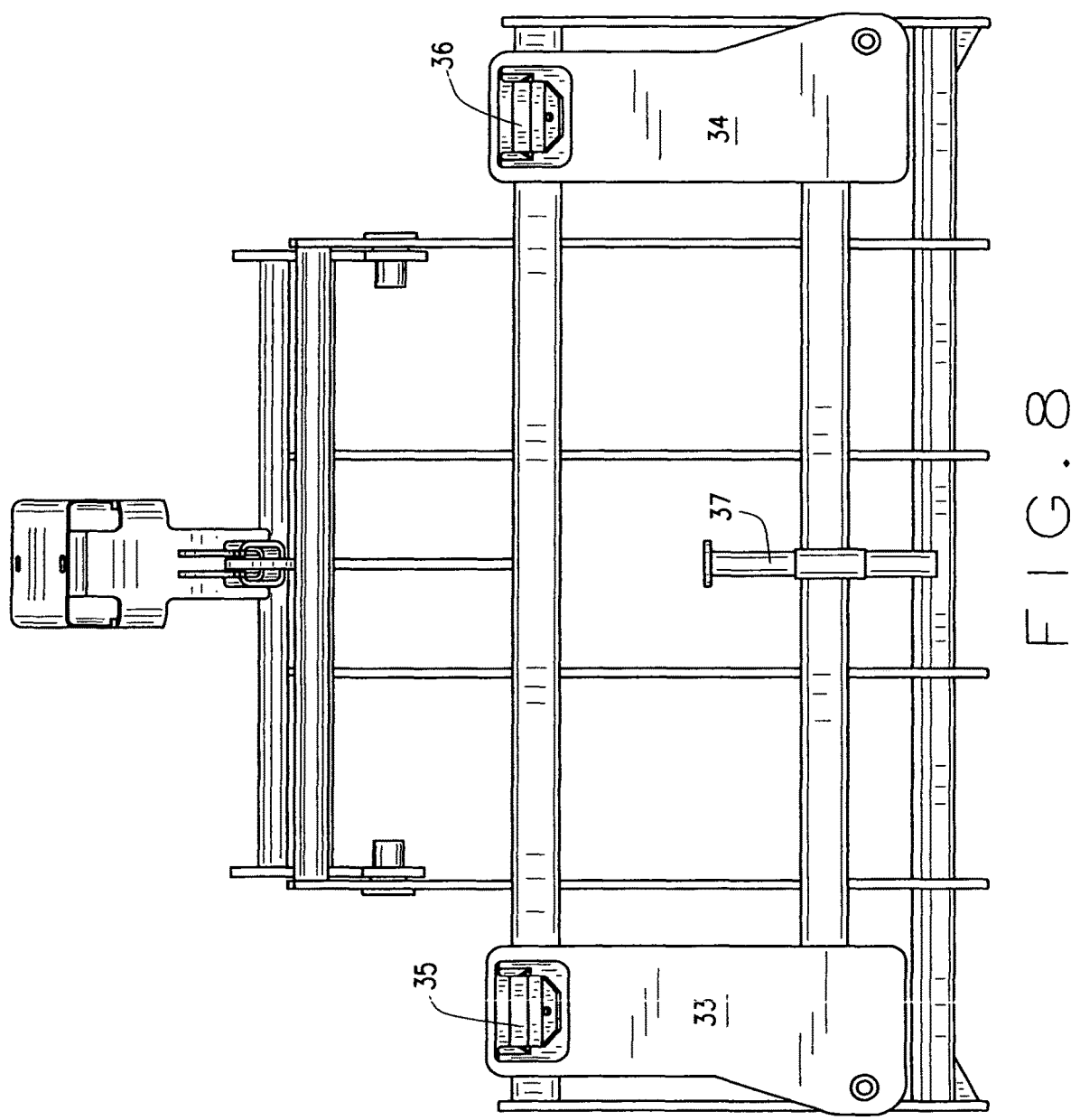

ELECTRIC GRAPPLE FOR COMPACT TRACTORS WITH LOADER

CROSS-REFERENCE TO RELATED APPLICATIONS

This non-provisional patent application claims priority as a continuation-in-part of the patent application having Ser. No. 15/932,541, filed on Mar. 13, 2018; the latter application claims priority as a continuation-in-part of the U.S. letters patent application having Ser. No. 14/999,087, filed on Mar. 29, 2016, now U.S. Pat. No. 10,066,360, and which application claims priority to its provisional patent application having Ser. No. 62/177,920, filed on Mar. 27, 2015.

FIELD OF THE INVENTION

This invention generally relates to a bucket attachment for pick up and conveyance of miscellaneous debris, and is formed as an accessory attachment to the loader of a compact tractor, generally having grapple application for use for picking up directly larger debris, such as brush, even smaller logs, tree trunks, for movement to another location for disposal, fill, or for other uses. The grapple for this modified design may extend fully, but preferably partially, across the base of the grapple, when assembled, and which may be electrically energized to provide for the necessary power to furnish usage of this device during its application.

BACKGROUND OF THE INVENTION

This invention generally relates to a grapple form of attachment for application to a small tractor, or other form of construction implement, and which may operate off of the battery power of the tractor, to achieve pick up of and to retain brush or other loose materials, during its application and usage.

As previously reviewed in the parent applications for this type of invention, and as noted in our U.S. Pat. No. 10,066,360, which is upon the ROCK BUCKET ATTACHMENT INCORPORATING SWEEP-IN GRAPPLE FOR CONVENING MISCELLANEOUS DEBRIS, that style of attachment, in the form of an implement, that can be attached to a tractor front end loader, was designed for pickup of debris, brush, sizeable tree components, when a heavy duty style of grapple is required, for the larger maintenance jobs undertaken, such as at a construction site, on the farm, or related locations. Then, the currently pending application having Ser. No. 15/932,541, was also upon a rock bucket form of attachment, but of a lesser dimension, where the grapple portion may only be located across a part of the width of the bucket attachment, so as to be useful for pickup of smaller quantities of debris, or limbs, as may be required.

The current invention even miniaturizes the form of grapple structured into this device, which can be attached to a compact or subcompact tractor, having its loader, and which may be energized from electricity, as from the vehicle battery, during its usage and application.

As previous reviewed, there are numerous tractor attachments that have been available in the prior art. Some of them include grapple means, for use for picking up of rock, or other debris. For example, there are attachments for skid steer loader buckets, and rock blocking attachments, as can been seen in the U.S. Pat. No. D686,250.

A construction bucket that includes its bucket, in addition to an attachable blade, that is hydraulically operated for the movement of dirt, and the like, is disclosed in U.S. Pat. No. 7,631,446.

An apparatus for on-site cleaning for landscape rock can be seen in the U.S. Pat. No. 7,559,962. A device that is mounted onto the front of loaders or tractors and for use for picking up and separating rock, by use of a reel type of sweep, can be seen in United States patent to Buysse, U.S. Pat. No. 5,682,953.

A backfill attachment for skid steer loader, and which can be used for digging dirt, and the like, can be seen in United States patent to Foster, U.S. Pat. No. 5,171,124.

A cylinder-type ground-raking attachment for a bucket equipped tractor can be seen in the U.S. Pat. No. 5,060,732, to Baskett.

The Patent No. RE. 33,198, to Ballinger, shows a strata rock bucket.

A rotary rock picker that incorporates a fork and reel assembly, and a stone bucket, can be seen in the United States patent to Malinowski, et al, U.S. Pat. No. 4,296,818.

A convertible forklift attachment that is capable of excavation and clasping of debris or other ground materials, can be seen in the United States patent to Ogawa, U.S. Pat. No. 4,283,866.

Other patents showing related structures, can be seen in a variety of additional patents, such the patent to Davis, U.S. Pat. No. 7,631,446; the patent to Burton, U.S. Pat. No. 6,357,933 which also discloses a rock bucket attachment.

Additional patents that show related structures, can be seen the patent Wadeington, Jr., U.S. Pat. No. 6,526,678; the patent to Staben, Jr., U.S. Pat. No. 5,564,885; and the patent to Miller, et al, U.S. Pat. No. 8,615,907; and the patent to DuBose, et al, Patent No. D332,271.

There are many other commercial uses of existing rock buckets that are on the market. These usually do attach to a skid steer unit, tractor front end loaders, and even wheel loaders. Some of these even include some clamp-type grapples, but many of them do not. The clamp-type grapple will help secure rocks and other debris within its associated bucket.

A Remington Manufacturing Company, Inc., of Kalida, Ohio, has a tine rock bucket for attachment to a skid steer, but the grapple type means for aiding in the loading of the formed bucket simply functions as a sweep, and through its pivot, helps pick up rock onto the associated bucket. It includes a singular pivot of its brake for attempting to move rocks onto its bucket tines.

A company named Loftness, has marketed a commercial-agricultural rock picker for skid steers and bi-directional tractors. This device also has a singular pivot-type mechanism for pushing rocks, boulders, and other debris onto its bucket.

Another product to Loftness Specialized Equipment Company, of Hector, Minn., is a skid steer attachment that attempts to dig into the soil beneath the rocks in order to attempt to achieve their pickup.

Another company by the name of Blue Diamond Attachments, of Knoxville, Tenn., shows a bucket with a singular pivot grapple means that tends to hold the rocks and debris onto the bucket, but the bucket is dug underneath the rock in preparation for their loading.

Horst Welding, of Listowel, Ontario, Canada, builds and markets a conventional rock bucket that has an optional hydraulic reel that rakes usually small rocks into the implement bucket.

A Westendorf Mfg., Co., Inc., of Onawa, Iowa, shows what is identified as a cat's claw grab, U.S. Pat. No. 7,431,554, published in 2008.

These are all examples of the commercial type products that are available, as published, and which are for pickup of rocks and other debris, some of which incorporate sweep arms, or reel sweeps, for attempting to load smaller rocks onto their bucket. Generally, though, these are for larger vehicle installations.

This is all shown in the various prior art known to the Applicants, some from prior searches, others as cited by the Patent Office in the two previous parent and application relied upon for priority in the cross-refence of this application.

SUMMARY OF THE INVENTION

This invention relates to a further improvement upon the type of a debris and rock gathering and conveying more subcompact type of grapple, but in this particular instance, one that can be secured to a variety of tractors, incorporating a motor, and wherein the implement can be operated off of the electric battery of such a vehicle, during its application and usage.

Essentially, the grapple for compact or sub-compact tractors, of the type that incorporate front end loaders, is designed of smaller scale components, to function as a grapple means, and which can be used with a smaller vehicle, such as a compact tractor, to attain its debris gathering and carrying functions. And, since this type of a mini grapple is not designed for collection and pick up of substantially heavy debris, such as large rocks and boulders, or tree trunks, it is designed on a smaller scale, and is electrically operated, as distinct from the larger grapples disclosed and known in the prior art, that are primarily functional due to the usage of extensive hydraulics, in their operations.

Essentially, the grapple of this invention includes its bucket portion, made up of a series of generally parallel arranged bars or tines, and which are secured together through the usage of various bottom, middle, and upper crossbars, generally between a series of side walls, and which function as the bucket portion for this implement. The bucket includes a back wall, formed between a series of mid walls, that are integrated into the structure of the bucket sidewalls, bars, and tines, and which back wall is designed for securement of what is identified as an industrial linear actuator, which integrates a high performance electric motor, and a ball screw, in order to move an upper formed clamp, pivotally associated with the bucket structure, and its back wall, in order pivot a front form rake like member from its opened and elevated position, when gathering debris, and forcing said rake like member pivotally downwardly, into proximate closure with the tine formed bucket, when it is required to move such collected debris, to another location, or for disposal.

Essentially, the linear actuator, which has a linear stroke of a number of specified inches, more or less -8 inches in length, is mounted onto a frame member, that secures with the front rake like member, and pivotally connects it onto the back wall, of the bucket structure, as can be understood. Then, telescopically located within the frame like member is an extension tube, which when the linear actuator is operated, and its screw urges its integral shaft forwardly, it urges a pusher plate to force the front rake like member downwardly, into a position where it, in combination with the bucket grapple, will pick up the collected debris, for transfer.

There are many other minor features that are incorporated into the structure of this compact grapple, that is provided with structural strength, to allow to be used for front end loading of debris, generally when the implement is moved by the sub-compact tractor forwardly, for use for debris collecting purposes. In addition, the back wall of the bucket includes an attached parking stand, either on one side of the bucket, or on both sides, and for use for providing a means for storing of the grapple implement, as when not in usage, but at the same time, keeps the grapple in an upright position, which greatly facilitates the hook-up of the device to the loader of the tractor, in preparation for its usage. The parking stand provides the solid footing when the unit is stored on a hard-flat surface, as during non-usage.

Some of the other attributes of this particular development is that it is for use as a small grapple for the sub-compact tractors, and which allows for an electric actuator to open and close its grapple clamp, during its usage. Its functions off electrical energy, and does not require the use of the type of hydraulic cylinder, as used in the prior art.

It is, the benefit of the current invention, to provide a grapple with an electric actuator that will cost less and can be more easily installed on different size sub-compact tractors.

Another object of this invention is the use of a telescopic square tube link below the actuator, where the telescopic linkage absorbs any side load that the bucket clamp may create, during its usage. The electric actuator of this invention, as used, provides the power to extend or retract the telescopic tube length which is a straight inline push or pull force.

A further principal object of this invention is to provide a mini grapple that can be used with the smaller type tractors, a feature which has not been attained in the debris collecting art, heretofore.

The grapple of this invention may be of a narrow width, when used with the sub-compact tractor, and may have a pickup width of approximately 28 inches, more or less, when moving debris, and picking it up, for disposal.

A further object of this invention is to utilize an electric motor type of industrial linear actuator, that only needs a stroke of approximately 8 inches, more or less, in order to open or close its front clamp, during usage. The linear actuator features a high-performance motor and ball screw to move the upper rake like clamp during its usage.

A further object of this invention is to provide an actuator frame, for the industrial linear actuator, that is of all steel, with stainless steel extension tube and overload clutch to furnish high performance as a smaller type of grapple structure, during usage.

A further object of this invention is to provide a grapple structure, that is electrically operated, and incorporates all of the various heavy duty power connectors that allow it to secure into the circuitry of the tractor, to obtain the electric charge necessary for operations of its electric motor embodied within its industrial linear actuator member.

Hence, in summary, the essence of this invention is to provide a grapple structure, that may be connected to the front-end loader of a compact tractor, be electrically energized, in order to furnish debris gathering and conveying uses, during its application.

These and other objects may become more apparent to those skilled in the art upon review of the Summary of the Invention as provided herein, and upon undertaking a study of the Description of its Preferred Embodiments, in view of the drawings.

BRIEF DESCRIPTION OF THE DRAWINGS

In referring to the drawings:

FIG. 7 is a rear view of the grapple of FIG. 4; and

FIG. 8 is a rear view of an electric grapple of the type that attaches to a specific type of compact tractor.

DESCRIPTION OF THE PREFERRED EMBODIMENT

As stated, this invention generally relates to an electric grapple for compact tractors with front end loaders. Essentially, the invention is a smaller embodiment of the larger sized hydraulically actuated grapples as previously defined in the Company's issued U.S. Pat. No. 10,066,360, and its pending continuation-in-part patent application as identified in the Cross-Reference herein.

Figure 1:
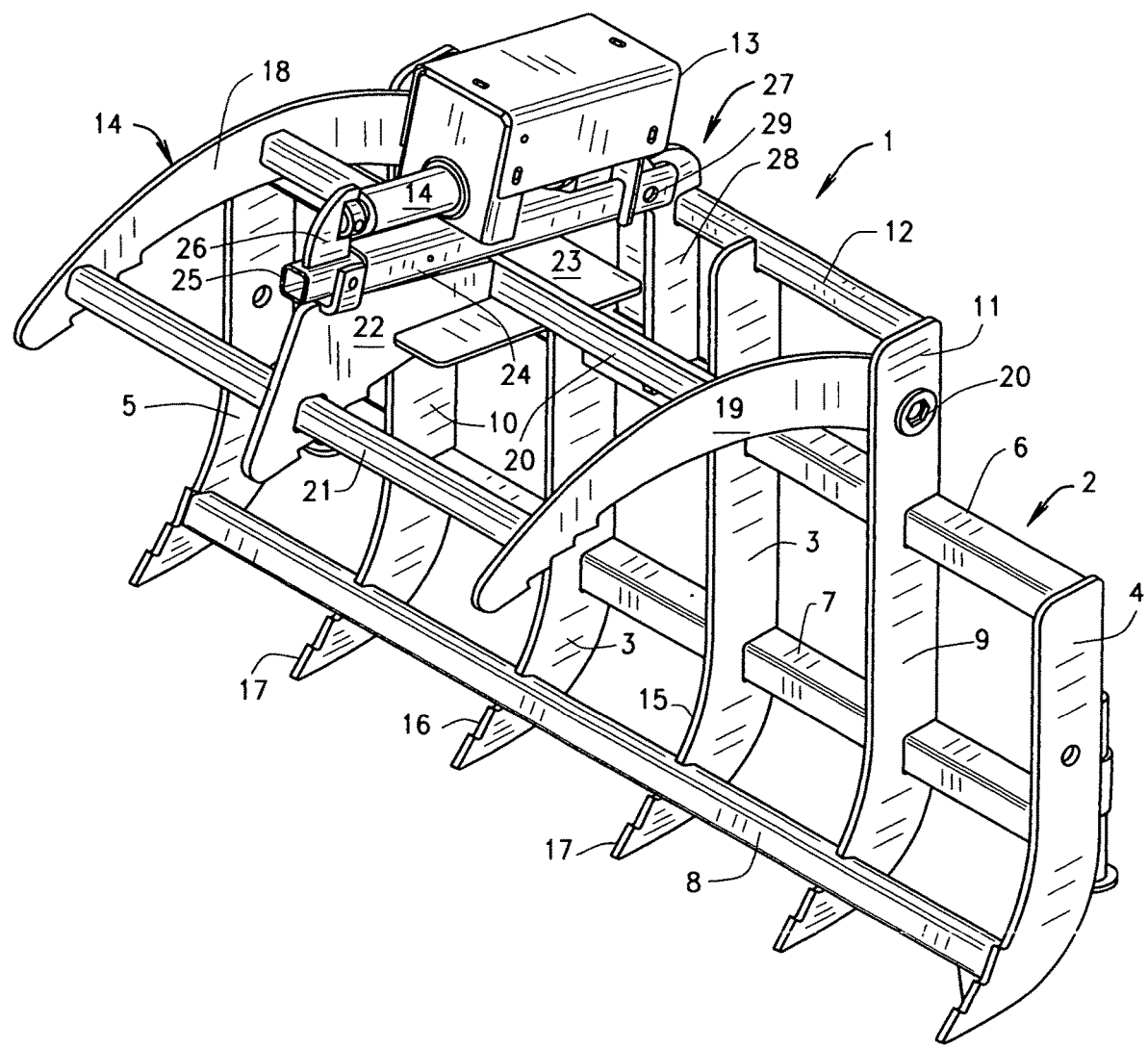
FIG. 1 is an isometric view of the electric grapple for compact tractors with loader.

As can be noted in FIG. 1, this invention is a smaller electric motor operated grapple 1, that may be attached to a loader, normally at the front end of a compact or subcompact tractor, of the type as known in the art. Such subcompact tractors are readily available upon the market, such as from companies identified the John Deere Tractor, or the universal skid steer quick attachment tractor, identified as the ESCG-48S & 48JD, as available from Deere or others, that manufacture and market these types of vehicles.

The electric grapple 1 of this invention includes a variety of structures, that are integrated into its operations, in order to provide for the accumulation and pickup of such debris, for its removal. Essentially, as noted in FIG. 1, the grapple includes a grapple bucket like structure 2 which functions as the more stationary portion of the structure, and which includes a series of bars or tines 3, that are arranged generally parallel between a pair of side walls 4 and 5 for the shown structure. There are a series of crossbars, such as the upper crossbar 6, a middle crossbar 7, and a bottom crossbar 8 and these bars are designed for holding the various tines 3, into position, and structurally secured to the side walls 4 and 5, as can be noted. Inwardly of the side walls are a pair of midwalls 9 and 10, and these walls extend upwardly, as can be noted at 11, and includes an upper structural frame 12 that extends partially across the shown structure, and which provide the support for holding the industrial linear actuator 13, which includes an electric motor, that powers a ball screw, for moving its shaft 14 outwardly, and inwardly, during usage of the device.

Initially, from a dimensional standpoint, the overall width of this smaller grapple may be approximately 4 feet, but it could be more or less, between its sidewalls 4 and 5. Furthermore, the industrial linear actuator 13, and more particularly its shaft, may extend approximately 8 inches, or incorporate and 8-inch stroke, but that length can also vary, in order to attain the operations of the device, during its usage.

In the formation of the back wall, formed by the times 9 and 10, and the structural frame 12, this portion of the device functions more as a rake, for initially the accumulation of debris, as the tractor moves forwardly, and can hold the various debris in position, in preparation for lowering of the grapple structure 14 of the device, as will be subsequently described. The back wall may be opened, between its tines 3, or it may include a back plate (not shown), or even a screen (not shown), along the back of the device, in order to aid in the retention of the variety of debris that is accumulated, and lifted, for disposal. Obviously, the loader portion of the tractor is capable of being elevated, during usage of this device, in order to pick up such debris, rocks, brush, limbs, and the like, for its conveyance and disposal.

Each of the tines 3, 9, 10, and the side walls 4 and 5, at their lower concaved ends, the concavity being shown, generally, at 15, incorporates a series of serrations, as noted at 16, with each of the serrations being substantially inclined, as noted at 17, and this aids in the pickup of debris, and its retention by means of the serrated structure, as the debris is loaded onto the grapple, during its usage.

Figure 4:
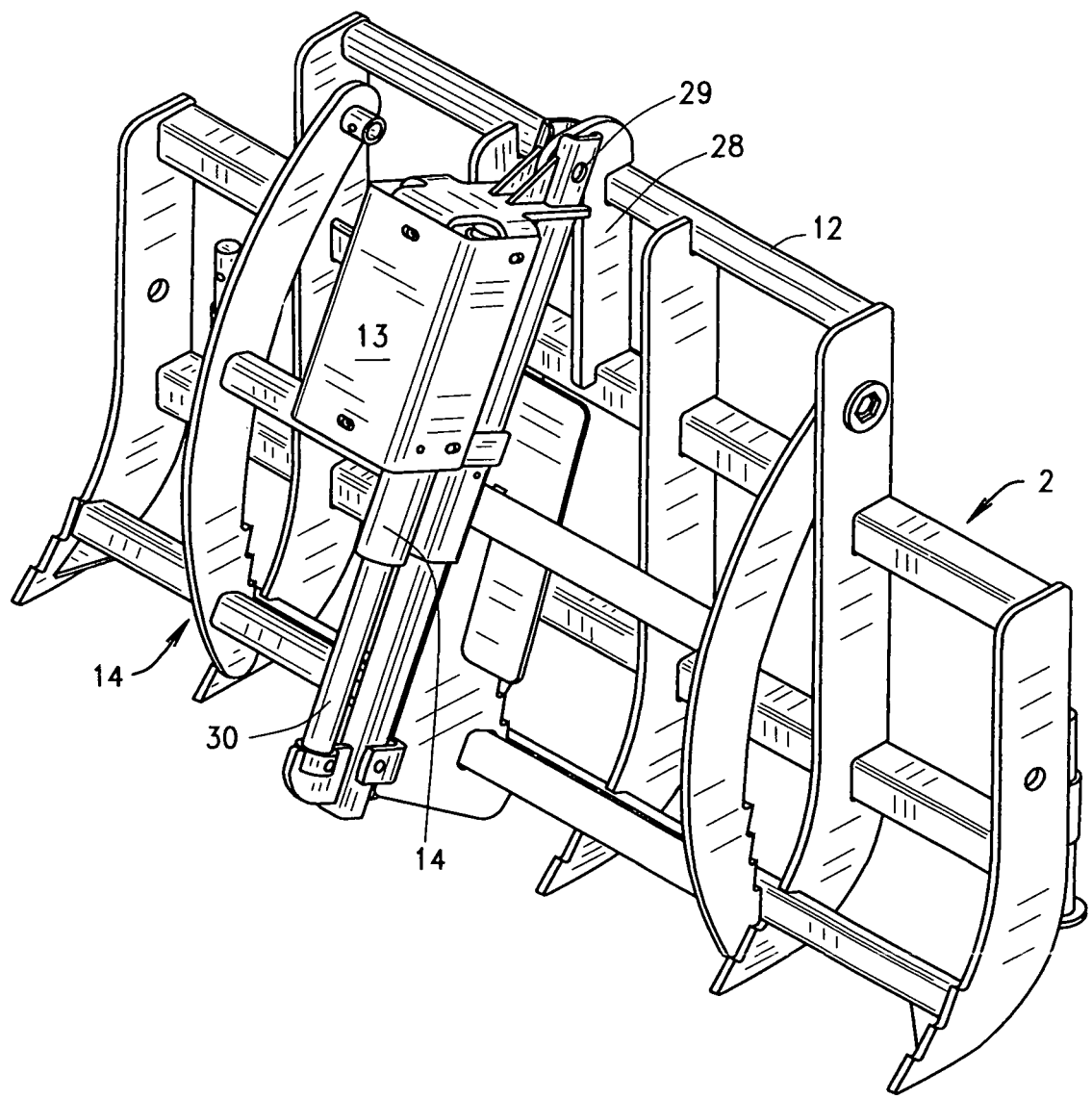
FIG. 4 is an isometric view of the electric grapple, in its activated and closed position, as when preparing to convey debris to a different location.
Figure 5:
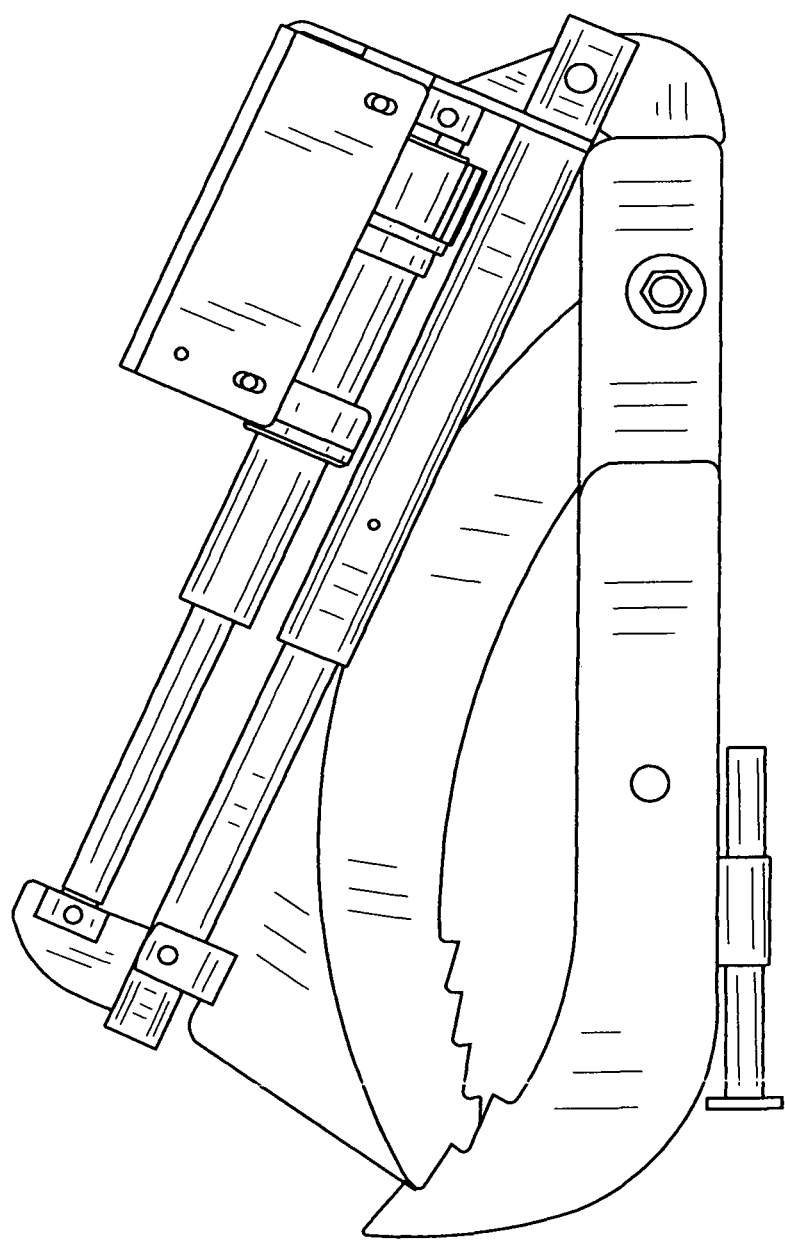
FIG. 5 is an end view of the electric grapple of FIG. 4.
Figure 6:
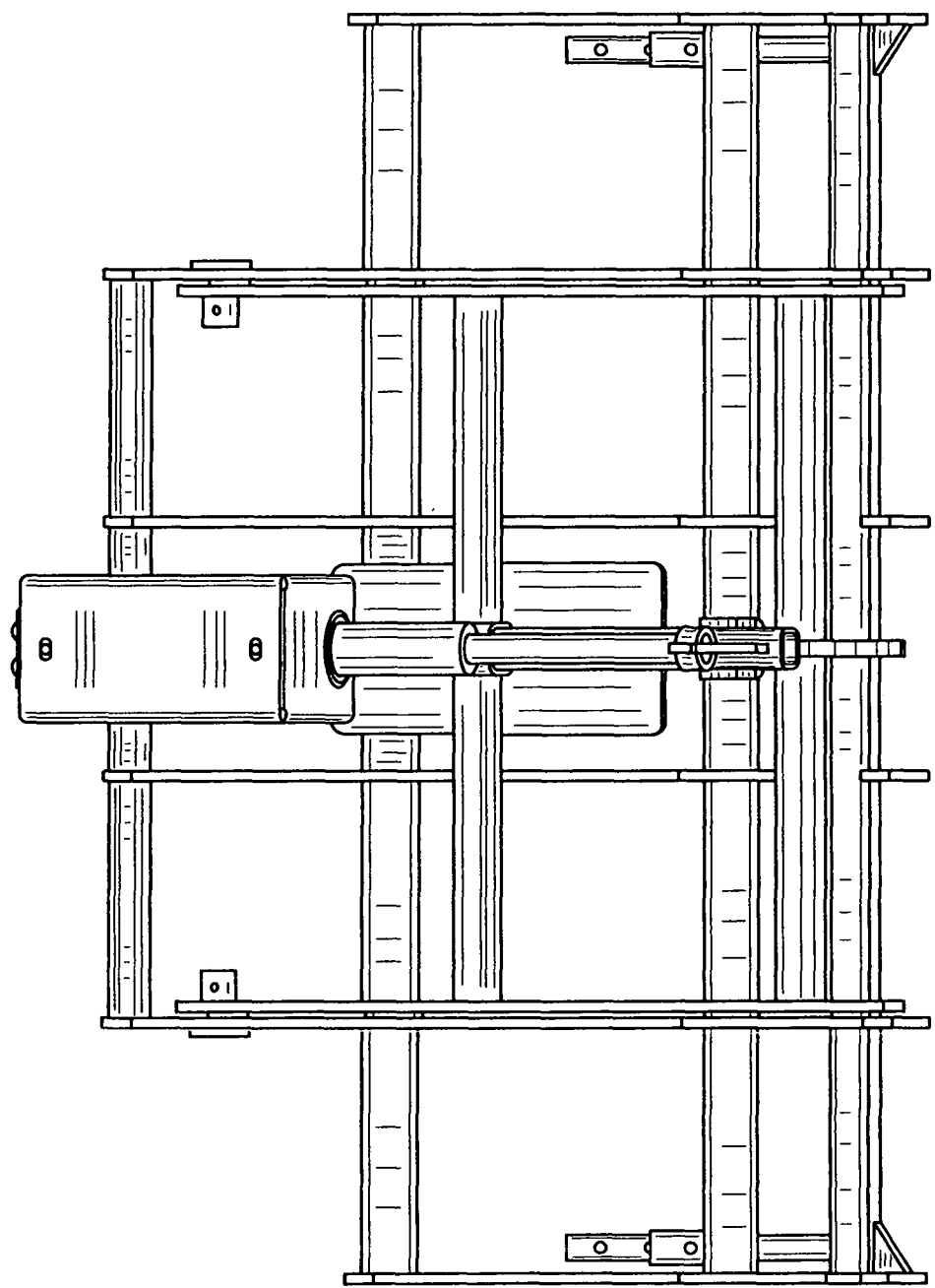
FIG. 6 is a front view of the grapple of FIG. 4.

The upper grapple structure, as noted at 14, includes a pair of front rake like members 18 and 19, and which are pivotally mounted, at their back ends, by means of the pivot pins 20 to their respective mid walls 9 and 10, and more particularly proximate their upper extensions 11, as can be noted. In addition, the rake like member, and more particularly its formed side arms 18 and 19, are structurally held into position, by means of the crossbracing 20 and 21, in order to reinforce the rake like member, in its usage. At the approximate midpoint of the rake member 14, is a pusher plate 22 which likewise connects with the crossbracing 20 and 21, and the pusher plate includes a further plate like structure 23 which is useful for preventing debris from rising upwardly and damaging the structure of the linear actuator 13, as can be understood. Further, pivotally connected to the pusher plate 22 is a telescopic formed tubular member, as noted at 24, which includes an inner tubular member 25 which can be extended, by means of the shaft 14 of the linear actuator, when it extends forwardly, and pushes the tubular member 25 outwardly of its telescopic tube 24, as when it is desired to force the grapple into a closed position, in the manner as can be seen in FIG. 4. There is a connector plate 26 securing onto the front of the tube 25, and it is pivotally connected to the front of the shaft 14, of the linear actuator. Furthermore, the back end of the telescopic tube 24, as noted at 27, pivotally connects onto the structure 28, by means of the pivot pin 29, and the plate 28 is secured with the upper structural frame 12, as can be noted.

Thus, as can be seen in FIG. 4, when the linear actuator 13 extends its shaft 14, generally such extension as can also be seen 30, it forcefully pivots the grapple structure 14 downwardly, pivoting about its pivot point 29, relative to the back wall structural frame 12, and its secured plate structure 28, as can be noted. When in this position, as noted in FIG. 4, any debris, rock, brush, or the like, that is accumulated against the bucket portion 2, is grasped, retained, and can be picked up, and the loader lifted, for removal of such debris to another location.

With regard to the back wall 2 of the grapple, there are various means for attachment of the tractor loader to this grapple implement 1, as can be noted. For example, in FIG. 7, there are a series of plate structures 31 and 32 secured to the back side of the back wall of the grapple bucket, and the loader of the tractor can be secured with this means for connection, to either side of the back wall of the grapple, as can be understood.

As can be seen in FIG. 8, there are a different plate like devices 33 and 34 that are provided for the back side of the grapple, and they include connecting means, as at their upper ends, as can be noted at 35 and 36, respectively, to which the loader of the tractor can be secured, when attaching this grapple implement to the same, in preparation for usage.

Figure 2:
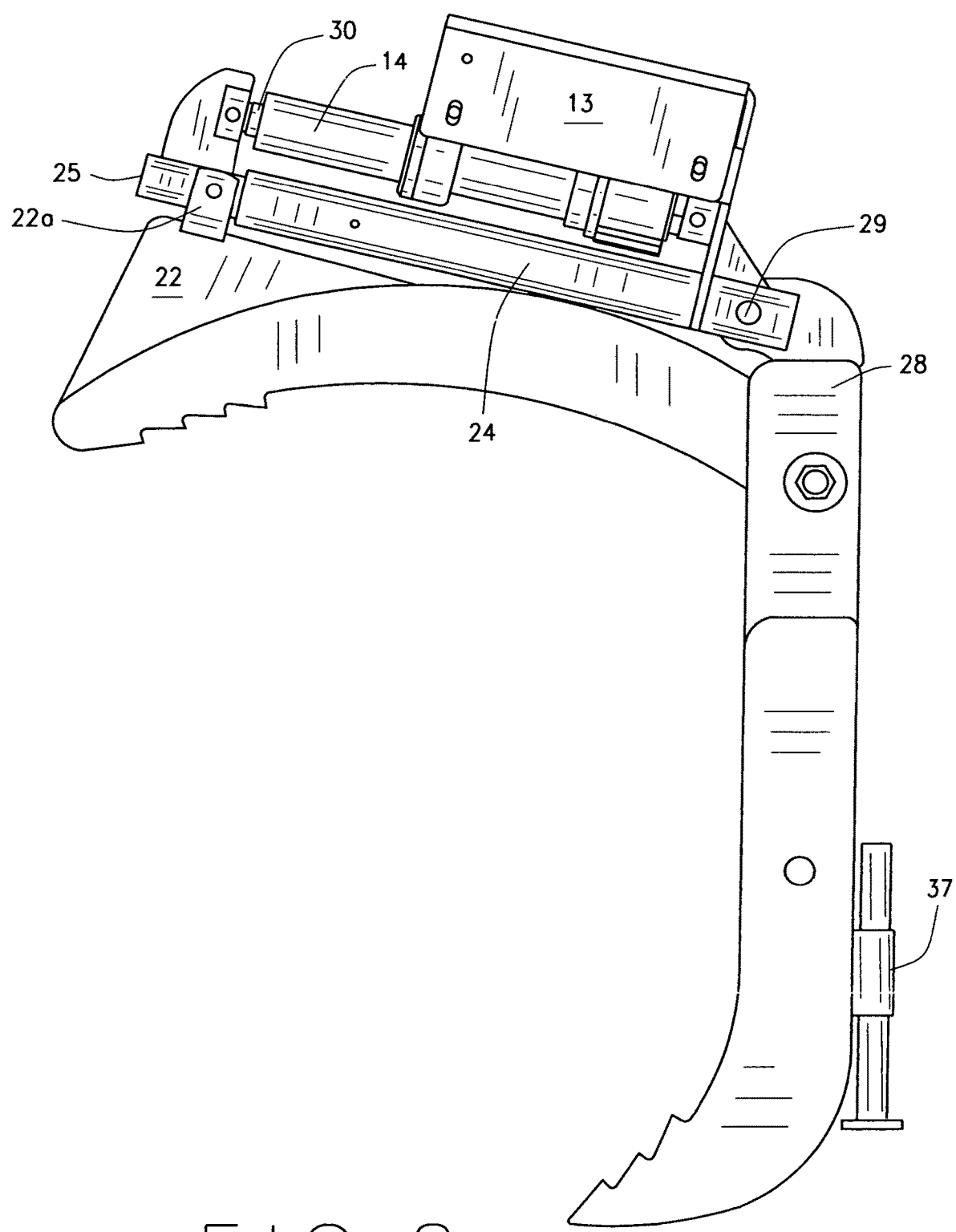
FIG. 2 is an end view of the electric grapple of FIG. 1.

As can also be seen in these FIGS. 7 and 8, in addition to FIG. 2, there is a parking stand, generally as noted at 37, and which has a series of apertures, as noted at 38, which provides for adjustment of the parking stand onto the ground, to stabilize its upright location, as when the grapple is removed from the tractor loader, during non-usage. You can see there are a variety of such apertures, that cooperate with the sleeve 39, so the same can be pinned into place, after adjustment, to provide for holding the implement in place, after usage, and in preparation for another connection with the tractor loader, for subsequent application. More than one parking stand may be employed.

Figure 3:
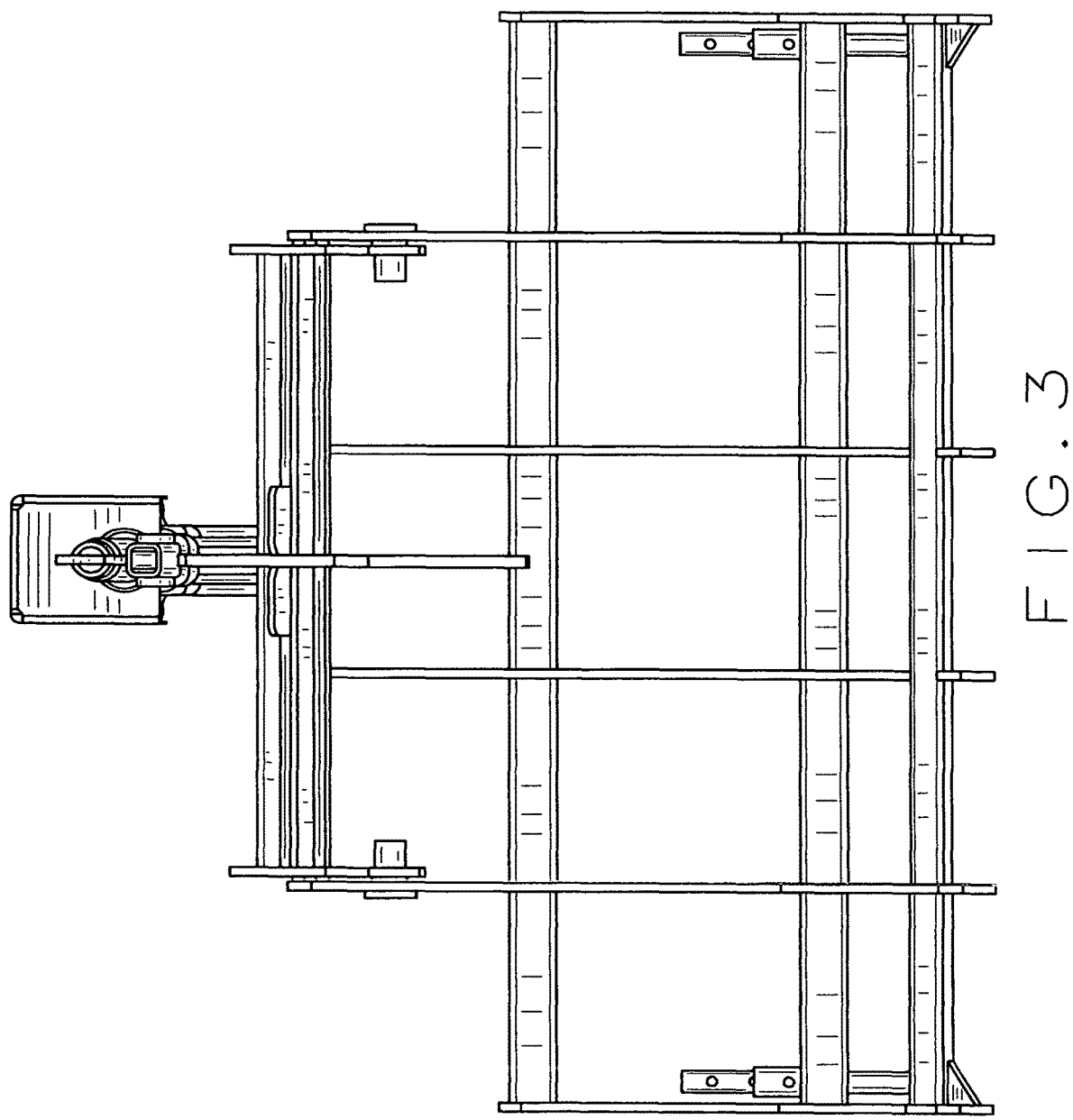
FIG. 3 is a front view of the electric grapple of FIG. 1.

FIGS. 2 and 3 show more closely the location of the industrial linear actuator, as previously identified at 13, and how it is secured to the telescopic tubing 24 and has its shaft, as at 14, extending forwardly therefrom, and the shaft encloses the screw extension 30 forwardly, for movement of the inner tube 25 forwardly, in order to initiate the pivot of the plate 22 downwardly, when the linear actuator is initiated. As can be seen, the back end of the telescopic tube 24 is pivotally pinned, as at 29, to the plate 28, while the front end of the extending tube 25 pivotally mounts to the bracket 22a, during usage and application. When the linear actuator is fully extended, as can be noted in FIG. 4, it will have pivoted the front rake like member 14 fully downwardly, to embrace and hold any debris within the grapple bucket member 2, as can be seen in said FIG. 4.

It may also be stated that the industrial linear actuator type of device, as noted at 13, may provide a stroke from its extending shaft 30, to approximately 8 inches in length, or it can be even greater, or less, depending upon the amount of extension required, to achieve the type of pivot of the front rake like member downwardly into its clamping position within the accessory, during its usage. As an example, such an actuator may be obtained from Concentric International, of 1901 Bell Avenue, Des Moines, Iowa, under Model No. GF-I7-1267 Actuator 12V, by way of example.

Just as a way of summary, this compact grapple may be used with what is identified in the trade as a sub-compact tractor, generally identified as one having power up to approximately 32-hp. The linear actuator as stated, may have an 8 inch stroke, in the preferred embodiment, but other length strokes may be used. Furthermore, the industrial actuator is developed and designed to work off of a 12 volt battery, of the type that may be found in such a sub-compact tractor. In addition, the various electrical connections may be made between the grapple implement, and the tractor loader, and it may include a rocker switch, operated from the loader, that can be used to raise and lower the implement, and to initiate the operations of the industrial actuator, for opening or closing of its rake like member, into proximity with the bucket grapple, as can be understood. There may be a heavy duty power connector, including its wiring harness, that provides for interconnecting between the industrial actuator, and the energy delivered from the battery, during usage of this device. All of these various electrical components are weather-proof, for safety purposes. In addition, and as can be seen in FIG. 1 and other figures of the drawings, the linear actuator 13 may be encased within a metal or related shield, to keep it free from encountering any debris, small sticks, or other trash, so as to shield it from any damage during its application and usage. And, when the grapple is fully opened, as can be seen in FIG. 1, it will have a grapple opening of approximately 30-36 inches, to provide for ease of gathering materials and other debris, during usage.

Variations or modifications to the subject matter of this invention may be considered by those in the art upon review of the disclosure for the invention as provided herein. Such variations, within the spirit of this invention, are intended to be encompassed within the scope of any claims to patent protection issuing upon this development. The depiction of the invention in the drawings, and as explained in the Specification, are meant to be an illustration of the principle of this invention. Various other modifications to it, within the scope of this invention, are intended to be encompassed within the scope of any patent protection issuing from this application.

I claim:

1. A debris grapple bucket attachment incorporating a sweep-grapple for pick up and conveying of miscellaneous debris, including rock, dirt, brush, and other debris, comprising:

a back wall formed bucket for said attachment, said bucket having a pair of side walls, a structured back wall attaching with said side walls, said back wall formed of a series of parallel arranged tines, the bottom of said tines being concaved and extending toward the front of said grapple, at least one crossbar connecting said tines to said side walls;

said grapple including a front rake like member pivotally connecting to at least a pair of said tines at their approximate upper ends and capable of pivoting from an upwardly open position to a lower clamping position with said grapple bucket to hold the debris for conveyance;

an electric operative linear actuator operatively connected to said rake like member and when energized, providing for pivoted movement of said rake like member of the grapple between its upper opened position to a lower clamping position during its usage;

a telescoping tubular member, pivotally connecting with said structured back wall, said telescoping tubular member having said linear actuator mounted thereon, said linear actuator having a shaft capable of extended movement, said shaft connecting with and extending to of the telescoping tubular member, said extending tubular member pivotally connecting with said front rake like member, such that when said linear actuator is electrically energized, extending its shaft, and extending its associated telescopic tubular member, for pivoting the rake like member downwardly into proximity with the bottom of the structured back wall to pick up and transport any debris to another location;

said rake like member includes a pair of side arms, a cross bracing extending between said side arms of said pivotal tubular member, a pusher plate connecting with the cross bracing, and said pusher plate pivotally connecting to the extending tubular member of the telescopic tubing, such that when the linear actuator is energized, providing for a downward pivoting of the rake like member, the telescopic tubular member, and its mounted linear actuator, into a downward position into proximity with the lower end of the back wall formed grapple, to provide for accumulation and conveyance of any debris located therein.

2. The grapple attachment of claim 1, wherein the lower end of said series of parallel arranged tines have upwardly directed serrations, in order to hold any debris deposited thereon.

3. The grapple attachment of claim 2, wherein said side arms of the rake like member have inwardly directed serrations in order to facilitate the hold of any debris within the attachment during usage.

4. The grapple attachment of claim 2 and including at least one back plate attached to the back wall of the bucket grapple, attach with means operatively associated with the said plate, to provide for attachment of the tractor loader implement in preparation for its usage and application.

5. The grapple attachment of claim 2 and including at least one parking stand connecting to the lower back of the back wall of the grapple bucket, and provided for holding the implement erect, when it is separated from the tractor loader, during non-usage.

6. The grapple attachment of claim 2, wherein said linear actuator includes a shield, surrounding its components, to provide protection to the actuator from any debris being handled during usage of the attachment.

\* \* \* \* \*